Aug. 18, 1931.  G. M. SACERDOTE  1,819,203
BATTER MIXING DEVICE
Original Filed March 3, 1926   3 Sheets-Sheet 1

Inventor
Guido M. Sacerdote

Aug. 18, 1931.     G. M. SACERDOTE     1,819,203
BATTER MIXING DEVICE
Original Filed March 3, 1926    3 Sheets-Sheet 2
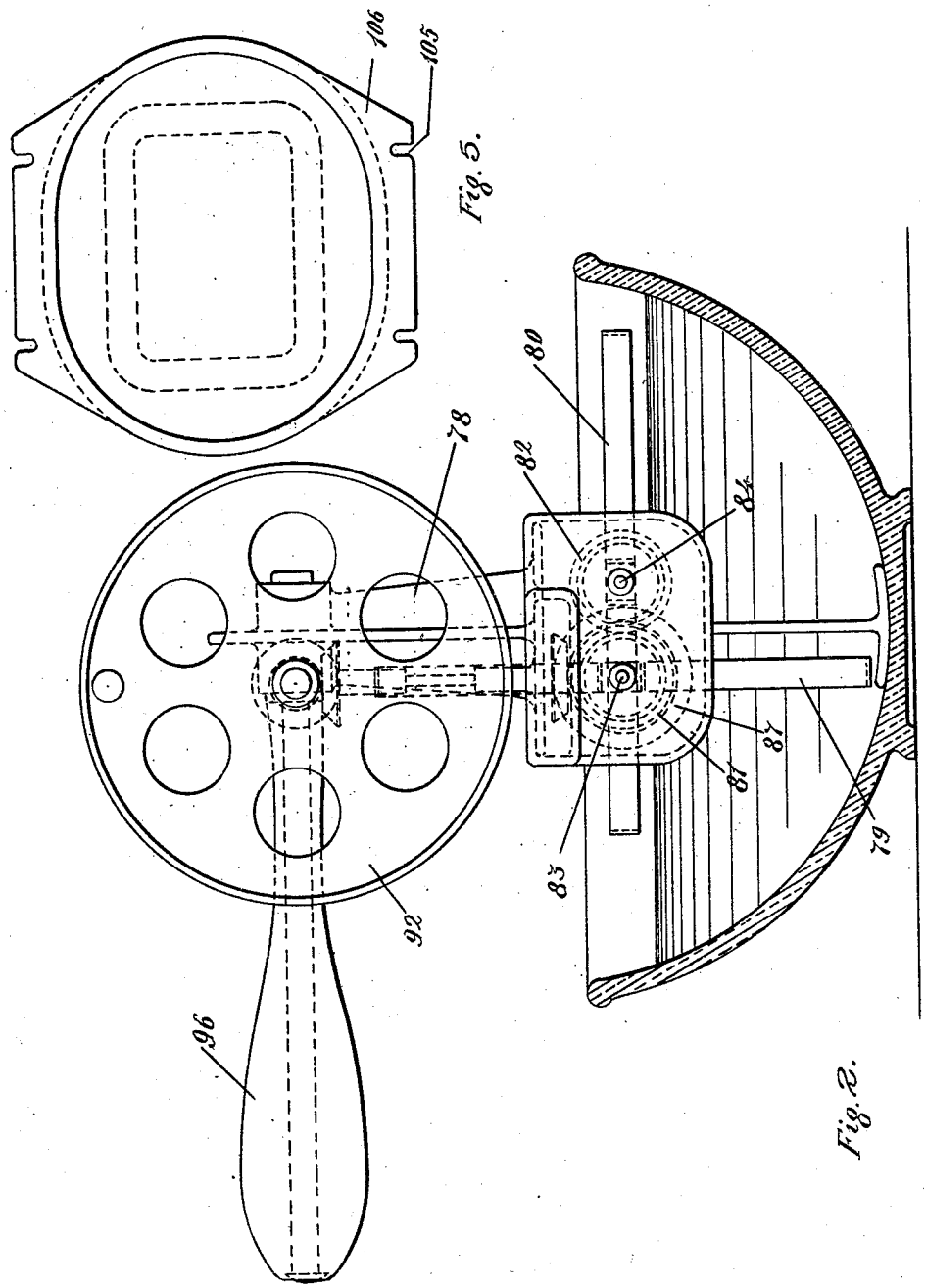
Inventor

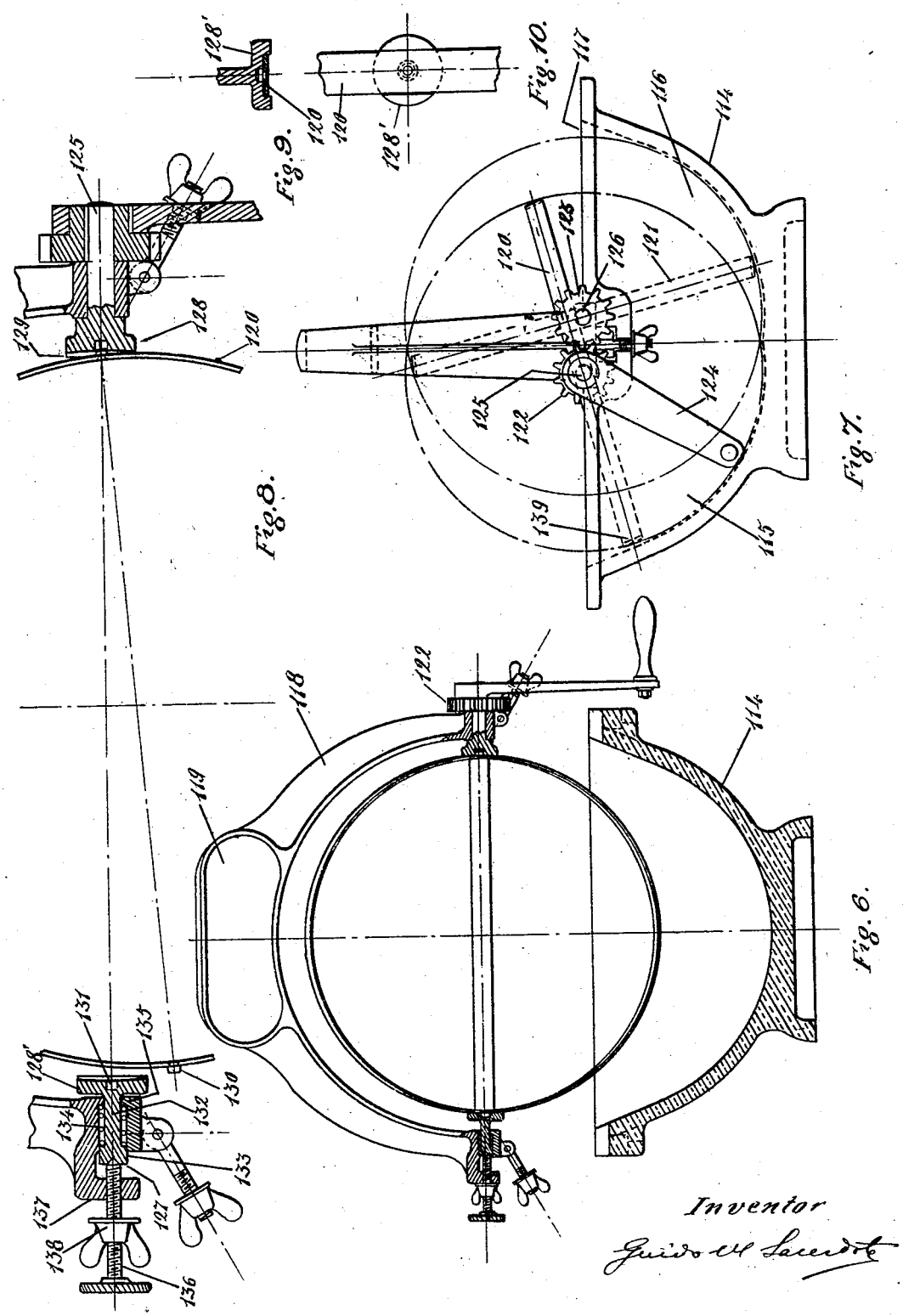

Patented Aug. 18, 1931

1,819,203

UNITED STATES PATENT OFFICE

GUIDO M. SACERDOTE, OF BAYSIDE, NEW YORK, N. Y.

BATTER MIXING DEVICE

Application filed March 3, 1926, Serial No. 91,946. Renewed January 6, 1931.

This invention relates to devices for mixing batter and more particularly refers to devices of the removable type adapted for family use, for mixing batter, cream, and so forth, in containers of any suitable size and type independent of or detachable from the device itself.

The primary object of this invention is to provide a batter mixing device of a novel and improved construction adapted to be inserted into a container for mixing batter, cream and the like, and adapted to be totally removed therefrom with equal ease.

Another object of this invention is to provide a batter mixing device of a relatively simple and inexpensive construction, adapted for family use, being a hand operated device for mixing small quantities of batter.

With these and other objects in view as will more fully appear as the description proceeds, this invention also comprises certain novel constructions and arrangements of parts as will be hereinafter fully described and claimed in the appended claims.

Small mixing devices of the portable type for family use, known as egg beaters are well known. The same generally include a frame, designed to be held vertically with its lower end resting against the bottom of a container, said frame carrying two quasi-circular blades rotatably mounted longitudinally of said frame, driven by two pinions in mesh with each other, and therefore, rotating in opposite directions. The frame being held in a substantially vertical position, it follows that the blades are rotating around substantially vertical axes and since the distance between their axes is much smaller than the diameter of the blades, the blades are ring shaped so as to permit relative rotation without interference. The device, furthermore generally comprises a driving wheel mounted at the upper part of the frame to rotate around a horizontal axis, in mesh with one of the blade pinions, so that the device is conveniently operated by holding the frame with one hand and rotating the blades with the other.

This type of device is quite generally used for beating eggs, cream or light ingredients; but even then the operation is not very effective because, while the material itself is thoroughly whipped there is no intimate association induced between the material and air because the material is mixed within itself. Furthermore, when cake batter is to be mixed or other mixtures of which flour is a substantial part, this device is found to be ineffective, and therefore, mixtures of the latter kind are generally mixed by hand by the aid of a spoon or a fork.

The purpose of the mixing operation is, of course, to produce a thorough aeration of the products mixed, causing the same to acquire a light and velvety texture, assisting towards satisfactory results from the subsequent cooking operation, or else merely improving its palatable qualities. To achieve better results in this direction, the blades are very often shaped with their beating surfaces at an angle so as to exert a propeller like action upon the mixture assisting the centrifugal and mixing action of the blades in forcing the lower layers upwardly in contact with the air.

However, a much more intimate and frequent contact with the air is necessary for the mixing of heavier mixtures, and the action of the device described being mainly to mix the material in a horizontal direction, that is, in the planes of rotation of the various points of the blades, owing to the density of the mixture the lower layers have small chance of coming into contact with the outside air. Furthermore, a thorough aeration can only be had when parts of the mixture are actually projected through the air, because the air becomes thus mixed to it by forced mechanical action and not merely by physical contact; and while the ordinary device partly accomplishes this end with a light mixture, it fails utterly to do so when a heavier mixture is involved.

In the device forming the object of the present invention the blades are caused to rotate around substantially horizontal axes so that the mixing of the batter takes place in vertical planes; therefore, if the blades are not entirely submerged into the batter, part of the batter is brought to the top and forced through the air at each revolution of the blades. This is the principle generally used in machines for mixing dough and therefore, it is not in a broad sense new; but its use in a portable device of the character mentioned is new and constitutes one of the main features of the present invention.

In the drawings I illustrate various embodiments of my invention, and referring to the same Fig. 1 is a cross sectional view in elevation of a device adapted for mixing heavy mixtures;

Fig. 2 is a side view in elevation of the same showing the bowl in section;

Fig. 5 is a plan view of the bowl used in connection with the device of Figs. 4 and 5;

Fig. 6 is a front view in elevation partly sectioned of my device in its preferred form showing the device proper after being removed from the bowl;

Fig. 7 is a side view in elevation of the same;

Fig. 8 is a fragmentary cross sectional view in elevation showing the way of detachably mounting the blades on their pivotal supports;

Fig. 9 is a detail plan sectional view showing the blade mounted on one of its pivotal supports; and Fig. 10 is a detail front view in elevation of the same.

From the premises, it follows that the chief characteristic of this invention resides in the fact that a beating or mixing device having one or more blades rotating on transverse axes is made totally independent of the batter container and adapted to be inserted therein or removed therefrom at will. This makes it possible to use and clean the bowl separately from the machine proper and it also makes possible to thoroughly clean the mixing mechanism independently of the bowl.

After the batter has been thoroughly mixed, it is desirable to have the bowl practically free of all encumbrances in order to remove the batter therefrom and also for sanitary reasons because the bowl can be cleaned much better than if the mixing mechanism were left within or attached to the bowl. The mixing mechanism itself also can be better cleaned when detached from the bowl and in the preferred form even the mixing blades are made detachable so that it is sufficient to clean the blades without handling the frame and other parts of the mechanism.

Another characteristic of my invention is the relatively simple and inexpensive construction of the device and the ease with which the mechanism can be inserted in or removed from the bowl or container.

When a batter containing flour such as used for making cakes, pancakes, light pastry, and so forth, is to be mixed, the resistance offered to the mixing members is quite considerable, so that it is best to rotate the mixing members at a relatively low speed, increasing their torque in proportion.

In mixing batter it is also advantageous to use mixing blades of a relatively large diameter reaching to the very bottom of the container used, because a superficial mixing action would be limited in its scope to the portion of batter immediately within reach of the blades.

Figure 1:
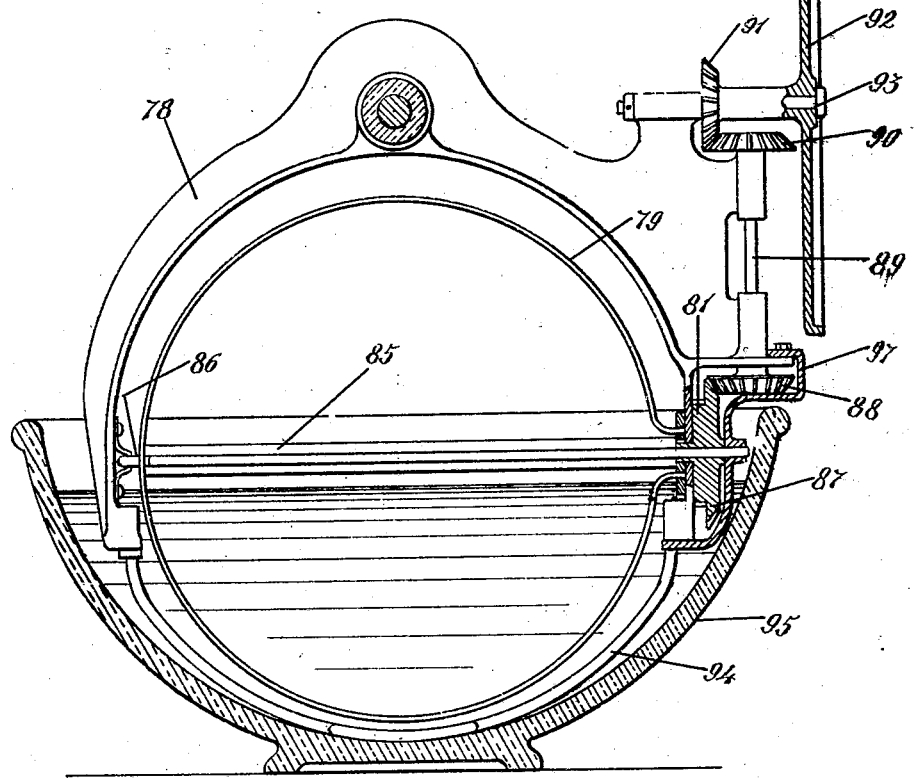

In Figs. 1 and 2, I illustrate a mixing device adapted to be freely inserted into or removed from a bowl or container, and for mixing heavy batter. In the same 78 designates a frame which is in the form of a fork between the legs of which are rotatably mounted two blades 79, 80. The same are attached to gears 81, 82, respectively, rotatably mounted upon supports 83, 84, which are the ends of the fixed frame 85, providing a pivotal support for the opposite ends of the blades as at 86.

Gear 81 is made integral with a conical gear 87 which is in mesh with and driven by a conical pinion 88 mounted on a vertical shaft 89. At its upper end, said shaft carries another conical pinion 90 in mesh with a conical pinion 91 integral with hand wheel 92 rotatably mounted upon horizontal shaft 93 which is in its turn mounted upon and laterally projecting from frame 78.

The various gears are so proportioned that one revolution of hand wheel 92 will produce one revolution or less of the blades; therefore, the full force exerted upon the handle of the hand wheel is available at the blade end or more, this obviously depending upon both the gear ratio and the relative diameters of the blades and of the hand wheel. The device is provided with a foot or rest 94 which may be held against the bottom of the container 95 and in order to better hold the device in position and counteract the reaction of the batter against the blades, the device is provided with a handle 96 horizontally projecting frontwise of the device, that is, in the plane of rotation of the blades. The blades are made of a relatively large diameter for the reasons previously stated, so that they can practically reach the bottom of the bowl while their pivotal supports remain above the batter. This insures a good aeration of the batter and also less resistance to the movement of the blades.

To further insure smooth running and cleanliness all of the gears are enclosed in a box 97, preventing the gears from becoming in contact with the latter. The device is entirely independent of the bowl or container and may be moved about in various directions so as to insure effective action upon the entire batch of batter contained in the bowl.

Figures 3, 4:
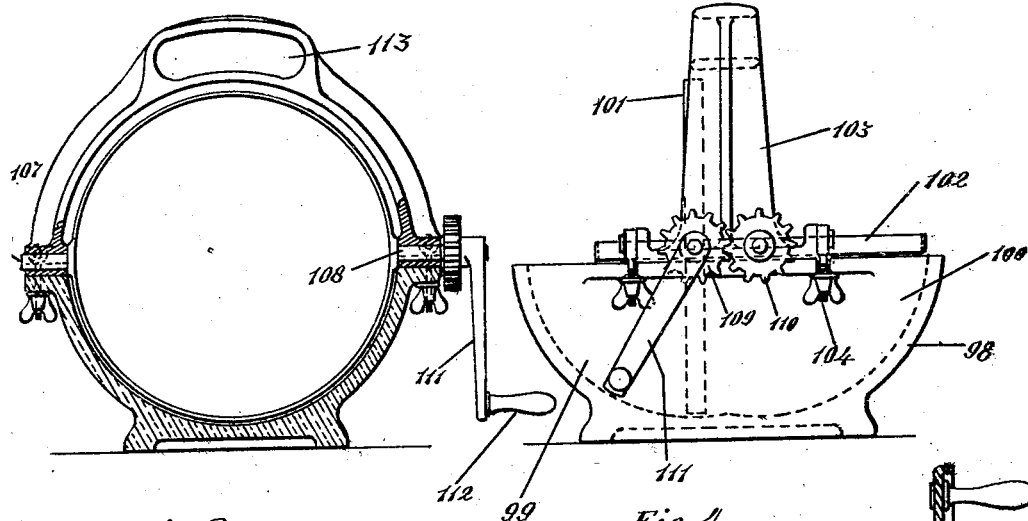
Fig. 3 is a cross sectional view in elevation of a different type of device of a somewhat simplified construction.
Fig. 4 is a side view in elevation of the same.

The device can be further simplified by resorting to an arrangement such as shown in Figs. 3, 4, and 5, where the mechanism may be temporarily attached to a specially designed bowl, said mechanism being adapted to be removed from the bowl in its entirety so as to retain the advantages which are the principal features of the present invention. The arrangement consists of a bowl or container 98 formed with two intersecting semi-spherical or globular portions 99, 100, concentric, respectively to blades 101, 102, which practically sweep over the entire inner surface of the container. The mechanism proper comprises a bifurcated frame 103, adapted to be mounted upon the container crosswise thereto, and provided with swinging bolts such as 104, adapted to enter slots 105, provided in the upper flanges 106 of the container and adapted to retain the frame in the operative position. Like in the previous case, the blades 101, 102 are rotatably mounted between the two legs of the frame, being provided with end shafts 107, 108.

In the present case, however, intermeshing gears 109, 110 carried by the blade shafts are rotated directly by means of a hand lever 111 mounted upon shaft 108, so that only two gears are employed instead of five needed in the previous case. One revolution of hand lever 111 therefore, corresponds to one revolution of the blades, but the force exerted by the blades against the batter will be greater than the force exerted by handle 112 of lever 111 if the distance of said handle from shaft 108 is more than the radius of the blades, as will be readily understood.

The frame is preferably formed with a handle portion 113 at its upper part, affording a convenient means for inserting the frame in position or for removing it therefrom, and at the same time affording convenient means for holding the device while the mixing operation is performed. In order to remove the mixing mechanism from the container, it is sufficient to release bolts 104 and to swing the same outwardly free of engagement with slots 105.

The device shown in Figs. 6 to 10, is built substantially on the same principle as the device just described, with the addition of some features which further increase its ease of operation and which make it possible to clean all the parts of the machine which are likely to become spattered with batter, without the necessity of handling the mechanism proper.

In the same 114 designates the bowl which is, like in the previous case formed by two intersecting portions 115, 116, of semi-spherical or globular shape, with the difference that at a certain distance from the top of the bowl or container, the sides of the same are made to flare out tangentially to the semi-circular contour of the lower portion, so that there will be a clearance such as indicated at 117 between the end and side sweep of the blades and the inner edge of the bowl or container. Said clearance may be one-quarter or three-eighths of an inch, or more and insures free passage to such portions of batter as may be sticking to the blades and which will therefore be carried within the bowl at a point well below the edge thereof. In the arrangement shown in Fig. 4, the blades come rather too close to the edge and there is therefore, the danger of such portions of the batter which may be sticking to the blades accumulating at the edges or falling down therefrom.

In the present case, I also employ a bifurcated frame 118, provided with an upper handle portion 119 and adapted to be mounted upon the bowl or container transversely thereof. The blades 120, 121 are rotatably mounted between the two legs of the frame and are operated by intermeshing gears 122, 123, which are driven by means of a hand lever 124 mounted on shaft 125.

The blades are therefore operated substantially in the same manner as those of the device shown in Figs. 3 and 4; but the way of mounting the blades is different, the blades being made detachable from their pivotal supports so that the blades only can be removed for cleaning purposes while the frame and the driving mechanism may be laid aside. This result is obtained by making end shafts 125, 126 carrying gears 122, 123, respectively, stationary in an axial direction, and by making the opposite shafts such as 127 axially movable in and out of blade engaging position. This detail is clearly illustrated in Fig. 8 where it will be observed that the inner end of each shaft is provided with an enlarged head portion 128, which is formed with a shallow recess 129, wide enough to receive the blade 120, as Figs. 9, 10 clearly show. For centering purposes, each blade is provided with two diametrally opposite pins 130, which may enter corresponding openings 131 in the shaft heads. When the blades are mounted in position as shown in Fig. 6 they are held between their respective end shafts, being positioned by pins 130, but being driven by the sides of grooves or recesses 129.

If, however, end shafts 127 are axially shifted outwardly, the blades are deprived of their support at one end and are free to fall away from the frame, as shown in Fig. 8. To make this possible each shaft 127, is formed with a stem 132 and an outer end 133 of a larger diameter and a spring 134 is inserted between the end 133 and the inner bearing portion 135, by being wound directly upon stem portion 132; said spring therefore tends to hold shaft 127 in its outward position as indicated in Fig. 8. Co-axially to said shaft is a screw 136, which is mounted in a lug portion 137 depending from the frame, and said screw is made to abut against the outer end of the shaft; so that by rotating said screw the shaft may be forced inwardly against the action of spring 134, to the position where it will engage and retain its blade 120 or 121. The screw 136 may be set in its position by means of a check nut 138 which is preferably made in the form of a wing nut so as to be easily operable by hand. When the screw is released, spring 134 will automatically force shaft 127 outwardly and the blade may be freely removed and cleaned.

The surfaces of the blades are preferably inclined in relation to the circumference so as to provide a propeller action forcing the batter inwardly as shown at 139, and the maximum radius of the blades is made a trifle smaller than the radius of the bowl portion 115, 116 so that the blades will practically sweep and scrape the entire surface of the bowl or container.

While the style of blades or beaters shown in the drawings is quite satisfactory for general purposes, other types and designs of blades may be employed if desired. The chief reason for advocating the type of blades shown is their relatively low cost of manufacture but practically any mixing member or members, provided with paddles or with agitating or mixing surfaces will do. It will also be noted that while two mixing members are shown the device can be simplified by providing one beater only or else its capacity can be further increased by providing three or more beaters instead of two.

It is obvious that many other details of construction of the device may be varied to a considerable extent without departing from the inventive idea. Accordingly, the drawings are intended for illustrative purposes only and not in a limiting sense, and therefore, I reserve myself the right to carry my invention into practice in any way or manner which may enter fairly into the scope of the appended claims.

I claim:

1. In a device of the class described, an open top container, a frame independent thereof, adapted to be removably mounted directly upon said container, two detachable beaters consisting of open frames revoluble on horizontal axes mounted on said frame, means, also carried by said frame, for simultaneously revolving said beaters in opposite directions, at the same speed, and hand operable means for detachably securing said frame onto said container.

2. In a device of the class described, an open top container, a portable frame, two beaters revoluble on horizontal axes mounted on said frame, means also mounted on said frame, for simultaneously revolving said beaters in opposite directions, at the same speed, and hand operable means for detachably mounting said frame directly onto said container.

3. In a device of the class described, an open top container, a portable frame, two detachable beaters revoluble on horizontal axes mounted on said frame, means also mounted on said frame, for simultaneously revolving said beaters in opposite directions, at the same speed, and hand operable means for detachably mounting said frame directly onto said container.

4. In a device of the class described, an open top container formed with laterally extending flanges provided with open end slots, a portable frame adapted to be directly mounted upon said container, two beaters revoluble on horizontal axes mounted on said frame, means, also mounted on said frame, for simultaneously revolving said beaters in opposite directions, at the same speed, and hinged bolts, carried by said frame, registering with, and insertable within said slots.

5. In a device of the class described, an open top container formed with laterally extending flanges provided with open end slots, a portable frame adapted to be mounted upon said container, two detachable beaters revoluble on horizontal axes mounted on said frame, means, also mounted on said frame, for simultaneously revolving said beaters in opposite directions, at the same speed, and hinged bolts, carried by said frame, registering with, and insertable within said slots.

6. In a device of the class described, an open top container formed with laterally extending flanges provided with open end slots, a portable frame adapted to be mounted upon said container, two beaters consisting of open frames, revoluble on horizontal axes, mounted on said frame, said beaters being arranged so that one is directed vertically when the other is in a horizontal plane, means also mounted on said frame for simultaneously revolving said beaters in opposite directions, at the same speed, and hinged bolts, carried by said frame, registering with, and insertable within said slots.

7. In a device of the class described, an open top container formed with laterally extending flanges provided with open end slots, a portable frame adapted to be mounted upon said container, two detachable beaters consisting of open frames, revoluble on horizontal axes, mounted on said frame, said beaters being arranged so that one is directed vertically when the other is in a horizontal plane, means also mounted on said frame for simultaneously revolving said beaters in opposite directions, at the same speed, and hinged bolts, carried by said frame, registering with, and insertable within said slots.

GUIDO M. SACERDOTE.